United States Patent [19]
Ohki et al.

[11] Patent Number: 5,483,534
[45] Date of Patent: Jan. 9, 1996

[54] TRANSMITTING SYSTEM HAVING TRANSMITTING PATHS WITH LOW TRANSMITTING RATES

[75] Inventors: Junichi Ohki; Toshio Koga, both of Tokyo, Japan

[73] Assignee: NEC Corporation, Tokyo, Japan

[21] Appl. No.: 68,171

[22] Filed: May 28, 1993

[30] Foreign Application Priority Data

May 29, 1992 [JP] Japan ............................. 4-138932

[51] Int. Cl.$^6$ ................................................ H04N 7/12
[52] U.S. Cl. ....................... 370/84; 370/112; 348/387; 375/257
[58] Field of Search ..................... 370/112, 84, 100.1, 370/94.1, 105.1, 118, 105, 60, 60.1, 71, 73, 124, 65.5, 64.56, 66, 61, 92; 327/407; 375/260, 257; 348/387, 385, 386, 6, 487; 455/4.2

[56] References Cited

U.S. PATENT DOCUMENTS

| | | | |
|---|---|---|---|
| 4,811,341 | 3/1989 | Fujimoto et al. | 370/112 |
| 5,065,396 | 11/1991 | Castellano et al. | 370/118 |
| 5,091,907 | 2/1992 | Wettengel | 370/89 |
| 5,202,886 | 4/1993 | Rossi et al. | 370/112 |

FOREIGN PATENT DOCUMENTS 62-188464  8/1987  Japan .

OTHER PUBLICATIONS

T. Koga et al., "Statistical Performance Analysis ... Encoder for Broadcast Television Signals", IEEE Transactions on Communications, vol. COM–29, No. 12, Dec. 1981, pp. 1868–1876.

*Primary Examiner*—Wellington Chin
*Assistant Examiner*—Ajit Patel
*Attorney, Agent, or Firm*—Sughrue, Mion, Zinn, Macpeak & Seas

[57] ABSTRACT

In a transmitting system, a first multiplexer multiplexes first through M-th encoded digital video signals from encoders to produce a primary multiplex signal comprising cells which have channel codes, address codes, and cell data, where M represents an integer greater than two. Each of the cell data represents a part of one of the encoded digital video signals. Each of the channel codes indicates one of the encoded digital video signals. Each of the address codes indicates a position of one of the cell datum. A first demultiplexer demultiplexes the primary multiplex signal to produce first through N-th primary demultiplex signals, where N represents an integer which is less than M and greater than one. A second multiplexer multiplexes the first through the N-th primary demultiplex signals from the first demultiplexer through first through N-th transmitting paths to produce a secondary multiplex signal. A second demultiplexer demultiplexes the secondary multiplex signal datum in response to the channel codes and the address codes to produce the first through the M-th encoded digital video signals.

7 Claims, 9 Drawing Sheets

TRANSMITTING SYSTEM HAVING TRANSMITTING PATHS WITH LOW TRANSMITTING RATES

BACKGROUND OF THE INVENTION

This invention relates to a transmitting system for use in combination with a plurality of encoders and decoders.

In the manner which will later be described more in detail, a conventional transmitting system is disclosed in "IEEE TRANSACTIONS ON COMMUNICATIONS, VOL. COM-29, No. 12, December 1981". This conventional transmitting system comprises a multiplexer connected to first through M-th encoders, a transmitting path, and a demultiplexer, where M represents an integer greater than two.

The first through the M-th encoders are supplied with first through M-th digital video signals, respectively. The first through the M-th encoders encodes the first through the M-th digital video signals to produce first through M-th encoded digital video signals, respectively.

The multiplexer is connected to the first through the M-th encoders. The multiplexer multiplexes the first through the M-th encoded digital video signals to produce a multiplex signal. The multiplex signal comprises a plurality of signal ports each of which has a channel code and a datum. The datum represents a part of one of the first through the M-th encoded digital video signals. The channel code identifies the first through the M-th encoded digital video signals.

The transmitting path is connected between the multiplexer and the demultiplexer. The transmitting path transmits the multiplex signal from the multiplexer to the demultiplexer. The transmitting path has a high transmitting rate which is a few hundred mega bits per second.

The demultiplexer is supplied with the multiplex signal through the transmitting path. The demultiplexer demultiplexes the multiplex signal to produce the first through the M-th encoded digital video signals and supply the first through the M-th encoded digital video signals to the first through the M-th decoders, respectively.

Another conventional transmitting system is disclosed in Japanese Unexamined Patent Prepublication (Kokai) No. 188484/1987. This conventional transmitting system comprises a channel demultiplexer supplied with first through third input digital video signals through first through third input channels, first through eighth encoders, first through eighth transmitting paths, and a decoder.

The channel demultiplexer demultiplexes the first through the third input digital video signals to produce first through eighth digital video signals. The first through the eighth encoders are connected to the channel demultiplexer, respectively. The first through the eighth encoders encode the first through the eighth digital video signals to produce first through eighth encoded video signals, respectively.

The first through the eighth transmitting paths are connected between the first through the eighth encoders and decoders. The first through the eighth transmitting paths transmit the first through the eighth encoded digital video signals from the first through the eighth encoders to the first through the eighth decoders, respectively.

The first through the third input channels are particular relation to the first through the eighth transmitting paths. The first through the eighth transmitting paths have first through eighth transmitting rates, respectively. The first through the eighth transmitting rates are different from each other. As a result, the first through the eighth encoded digital video signals reach at different time instants to the first through the eighth decoders. Consequently, the decoders can not reproduce correctly the digital video signals.

SUMMARY OF THE INVENTION

It is therefore an object of this invention to provide a transmitting system which comprises a plurality of transmitting paths having low transmitting rates.

It is another object of this invention to provide a transmitting system which can reproduce correctly digital video signals.

Other objects of this invention will become clear as the description proceeds.

According to this invention, there is provided a transmitting system for use in combination with first through M-th encoders and decoders, where M represents an integer greater than two. The transmitting system comprises: (A) a first multiplexer for receiving first through M-th encoded digital video signals from the first through the M-th encoders, respectively, to produce a primary multiplex signal comprising a plurality of cells which have channel codes, address codes, and cell data, respectively, each of the cell data representing a part of one of the first through the M-th encoded digital video signals, each of the channel codes indicating one of the first through the M-th encoded digital video signals, each of the address codes indicating a position one of the cell data in each of the first through the M-th encoded digital video signals; (B) a first demultiplexer connected to the first multiplexer for demultiplexing the primary multiplex signal to produce first through N-th primary demultiplex signals each of which represents one of the cells, where N represents an integer greater than M; (C) first through N-th transmitting paths connected to the first demultiplexer for transmitting the first through the N-th primary demultiplex signals, respectively; (D) a second multiplexer connected to the first through the N-th transmitting paths for multiplexing the first through the N-th primary demultiplex signals to produce a secondary multiplex signal; and (E) a second demultiplexer connected to the second multiplexer for demultiplexing the secondary multiplex signal in response to the channel codes and the address codes to produce the first through the M-th encoded digital video signals and supply the first through the M-th encoded digital video signals to the first through the M-th decoders, respectively.

DESCRIPTION OF THE PREFERRED EMBODIMENT

Figure 1:
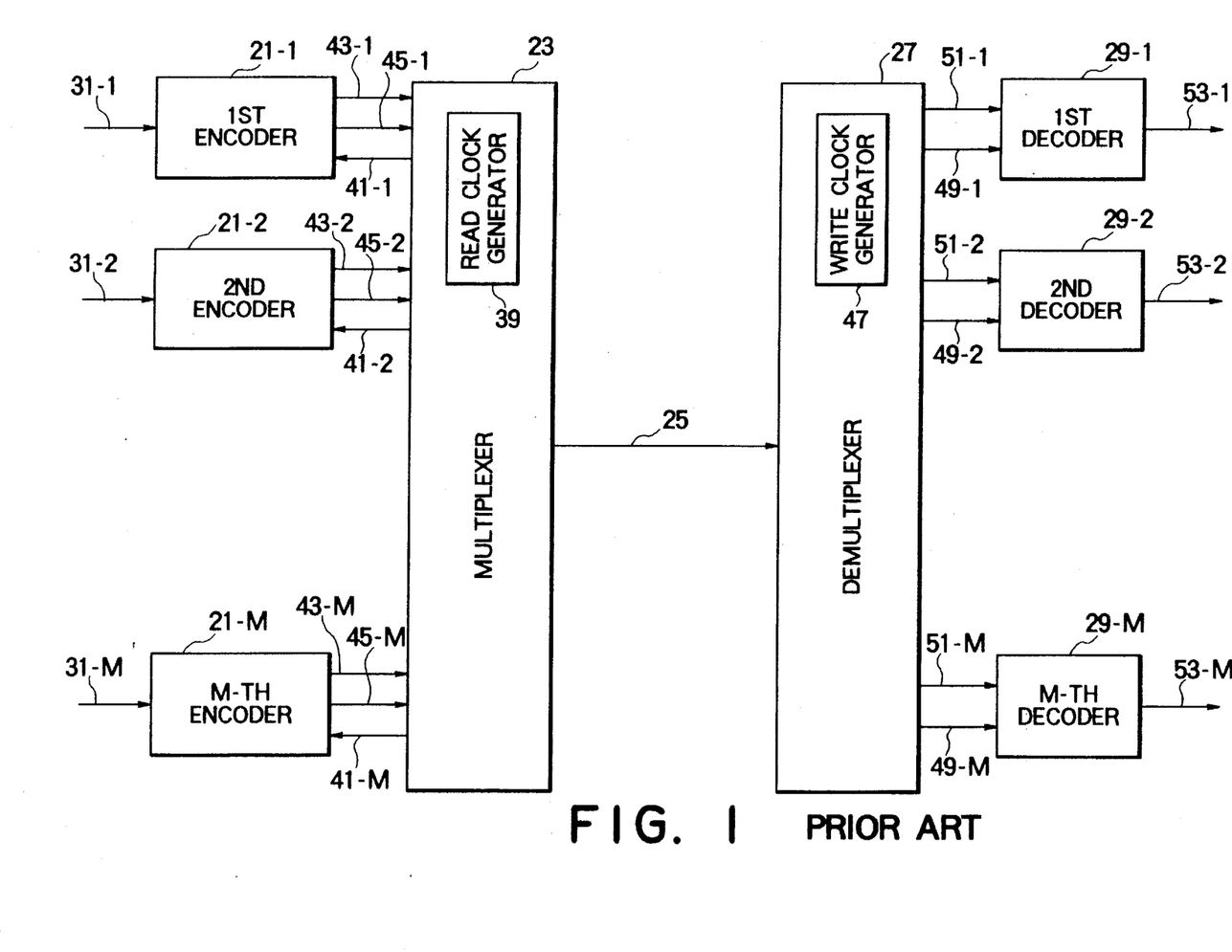
FIG. 1 is a block diagram of a conventional transmitting system.
Figure 2:
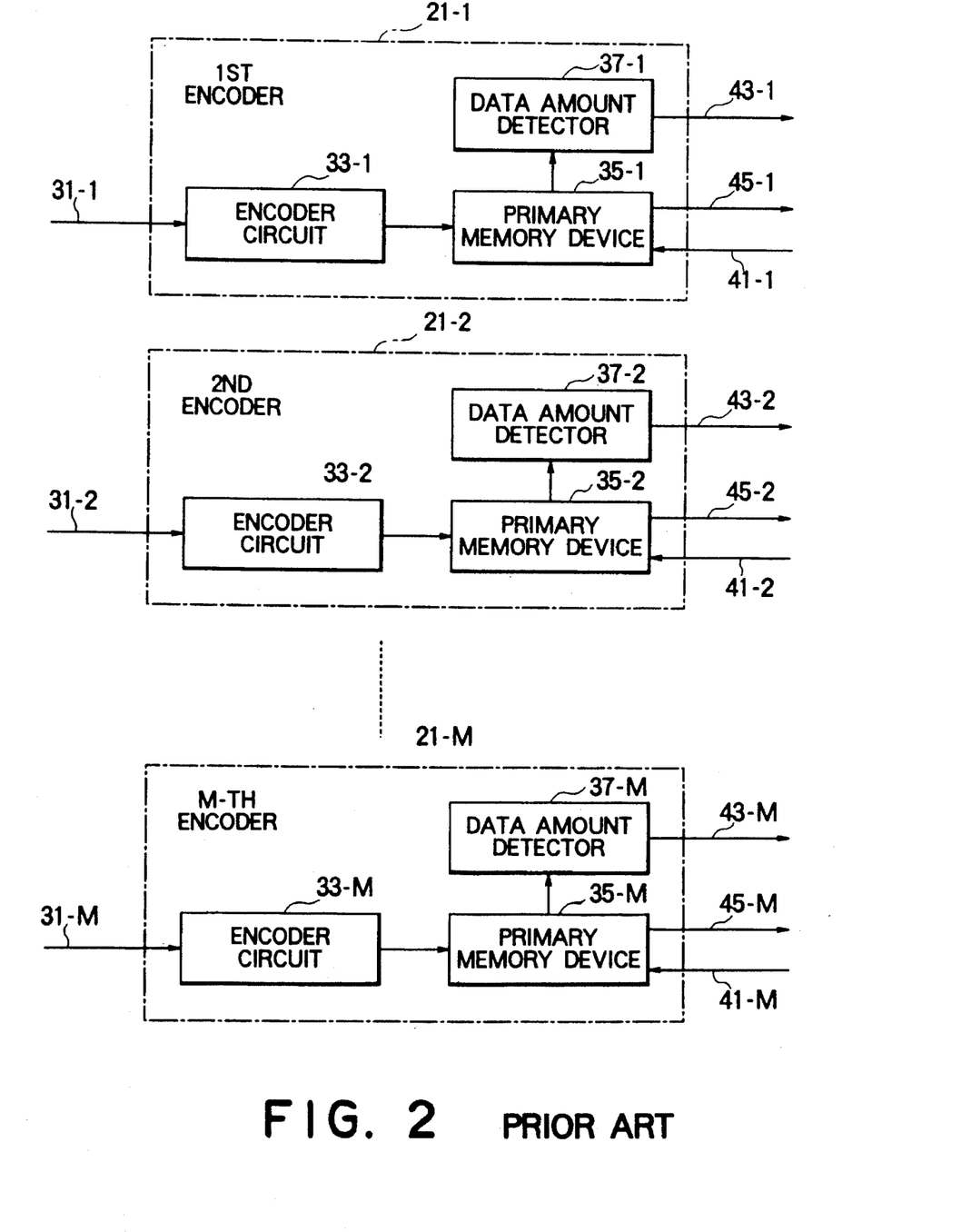
FIG. 2 is a block diagram of encoders for use in the conventional transmitting system illustrated in FIG. 1.

Referring to FIGS. 1 and 2, a conventional transmitting system will first be described for a better understanding of this invention.

In FIG. 1, the conventional transmitting system comprises first through M-th encoders 21-1 to 21-M, a multiplexer 23, a transmitting path 25, a demultiplexer 27, and first through M-th decoders 29-1 to 29-M. The first through the M-th encoders 21-1 to 21-M are supplied with first through M-th digital video signals through first through M-th input channels 31-1 to 31-M.

In FIG. 2, the first through the M-th encoders 21-1 to 21-M comprise first through M-th encoder circuits 33-1 to 33-M, first through M-th primary memory devices 35-1 to 35-M, and first through M-th data amount detectors 37-1 to 37-M, respectively. The first through the M-th encoder circuits 33-1 to 33-M are supplied with the first, through the M-th digital video signals through the first through the M-th input channels 31-1 to 31-M. The first through the M-th encoder circuits 33-1 to 33-M encode the first through the M-th digital video signals to produce first through M-th encoded digital video signals, respectively.

The first through the M-th primary memory devices 35-1 to 35-M are connected to the first through the M-th encoder circuits 33-1 to 33-M, respectively. The first through the M-th primary memory devices 35-1 to 35-M memorize the first through the M-th encoded digital video signals, respectively. The first through the M-th data amount detectors 37-1 to 37-M detect first through M-th amount of the first through the M-th encoded digital video data in the first through the M-th primary memory devices 35-1 to 35-M to produce first through M-th amount detect signals, respectively.

Turning to FIG. 1, the multiplexer 23 comprises a read clock generator 39 which generates first through M-th read clock signals to supply the first through the M-th read clock signals to the first through the M-th primary memory devices 35-1 to 35-M (FIG. 2) through first through M-th read lines 41-1 to 41-M, respectively. The multiplexer 23 is connected to the first through the M-th data amount detectors 37-1 to 37-M (FIG. 2) through first through M-th detector lines 43-1 to 43-M, respectively. The multiplexer 23 is supplied with the first through the M-th amount detect signals from the first through the M-th data amount detectors 37-1 to 37-M, respectively.

The multiplexer 23 supplies the first through the M-th read clock signals to the first through the M-th primary memory devices 35-1 to 35-M (FIG. 2), respectively, in response to the first through the M-th amount detect signals. The first through the M-th primary memory devices 35-1 to 35-M Supply the first through the M-th encoded digital video signals through first through M-th data lines 45-1 to 45-M, respectively, when the first through the M-th primary memory devices 35-1 to 35-M are supplied with the first through the M-th read clock signals, respectively.

The multiplexer 23 multiplexes the first through the M-th encoded digital video signals to produce a multiplex signal. The multiplex signal comprises a plurality of signal parts which have channel codes and data, respectively. Each of the data represents a part of one of the first through the M-th encoded digital video signals. Each of the channel codes indicates one of channels of the first through the M-th encoded digital video signals.

The transmitting path 25 is connected between the multiplexer 23 and the demultiplexer 27. The transmitting path 25 transmits the multiplex signal from the multiplexer 22 to the demultiplexer 27. The transmitting path 25 has a high transmitting rate which is a few hundred mega bits per second.

The demultiplexer 27 is supplied with the multiplex signal through the transmitting path 25. The demultiplexer 27 comprises a write clock generator 47 which generates first through M-th write clock signals in response to the channel codes to supply the first through the M-th write clock signals to the first through the M-th decoders through first through M-th write lines 49-1 to 49-M, respectively. The demultiplexer 27 demultiplexes the multiplex signal in response to the channel codes to produce the first through the M-th encoded digital video signals and supply the first through the M-th encoded digital video signals to the first through the M-th decoders 29-1 to 29-M through first through M-th signal lines 51-1 to 51-M in response to the first through the M-th write clock signals, respectively. The first through the M-th decoders 29-1 to 29-M decodes the first through the M-th encoded digital video signals to produce the first through the M-th video digital signals and supply the first through the M-th video digital signals to first through M-th output channels 53-1 to 53-M, respectively.

Referring to FIGS. 3 to 9, the description will proceed to a transmitting system according to a preferred embodiment of this invention. Similar parts are designated by like reference numerals.

Figure 3:
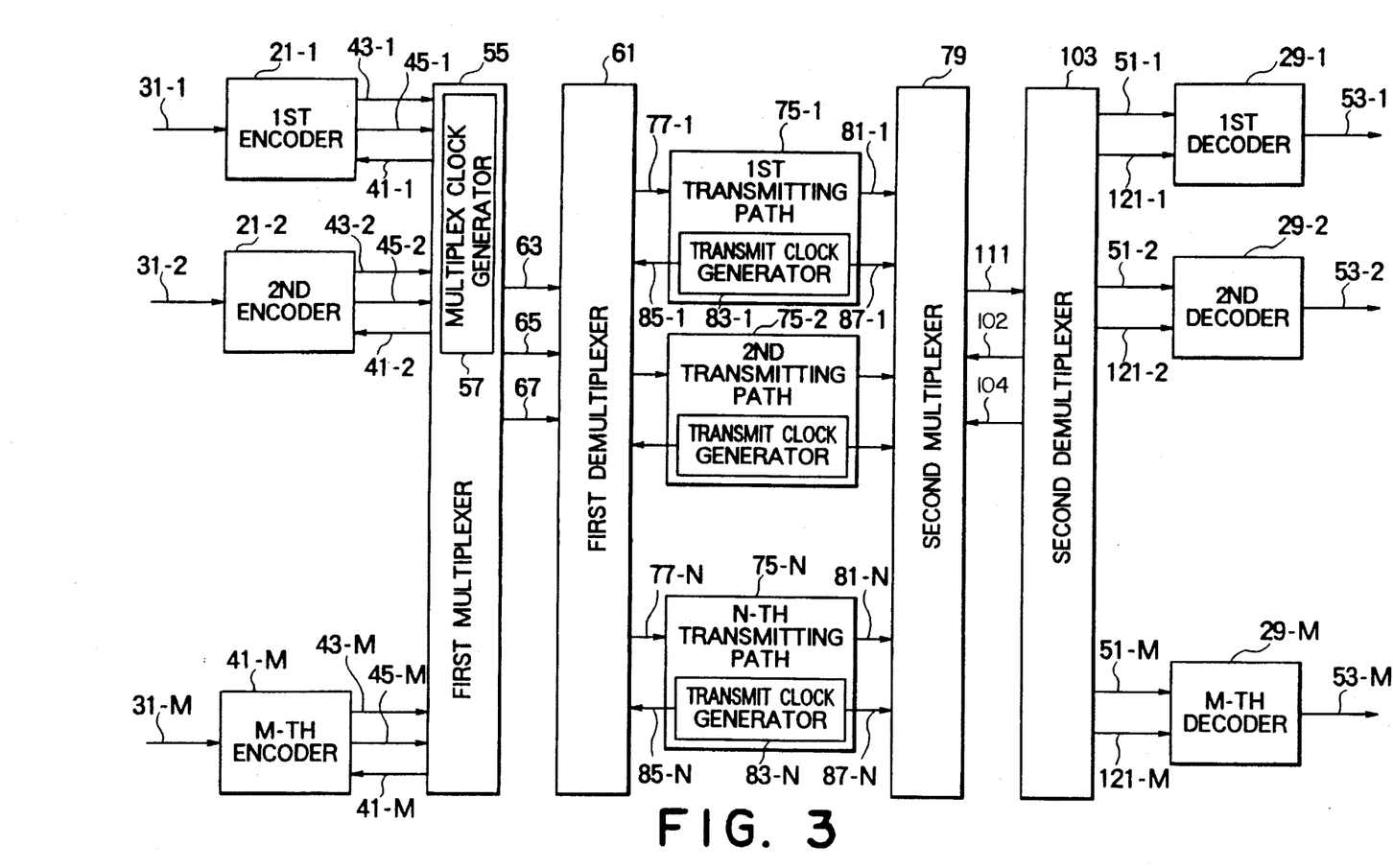
FIG. 3 is a block diagram of a transmitting system according to an embodiment of this invention.

In FIG. 3, a first multiplexer 55 is connected to the first through the M-th encoders 21-1 to 21-M through the first through the M-th read lines 41-1 to 41-M, detector lines 43-1 to 43-M, add data lines 45-1 to 45-M. The first multiplexer 55 comprises a multiplex clock generator 57. The multiplex clock generator 57 generates a first clock signal having a plurality of multiplex clock pulses and a cell signal having a plurality of cell clock pulses. The multiplex clock pulses have a multiplex cycle time. The cell clock pulses have a cell cycle time. The cell cycle time is longer than the multiplex cycle time.

The first multiplexer 55 supplies at the cell cycle time the first clock signal to the first through the M-th primary memory devices 35-1 to 35-M through the read lines 41-1 to 41-M, respectively (FIG. 2). The first through the M-th primary memory devices 35-1 to 35-M supply the first through the M-th encoded digital video signals to the first multiplexer 55 through the first through the M-th data lines 45-1 to 45-M when the first through the M-th primary memory devices 35-1 to 35-M are supplied with the multiplex clock pulses, respectively.

The first multiplexer 55 multiplexes the first through the M-th encoded digital video signals to produce a primary multiplex signal.

Figure 4:
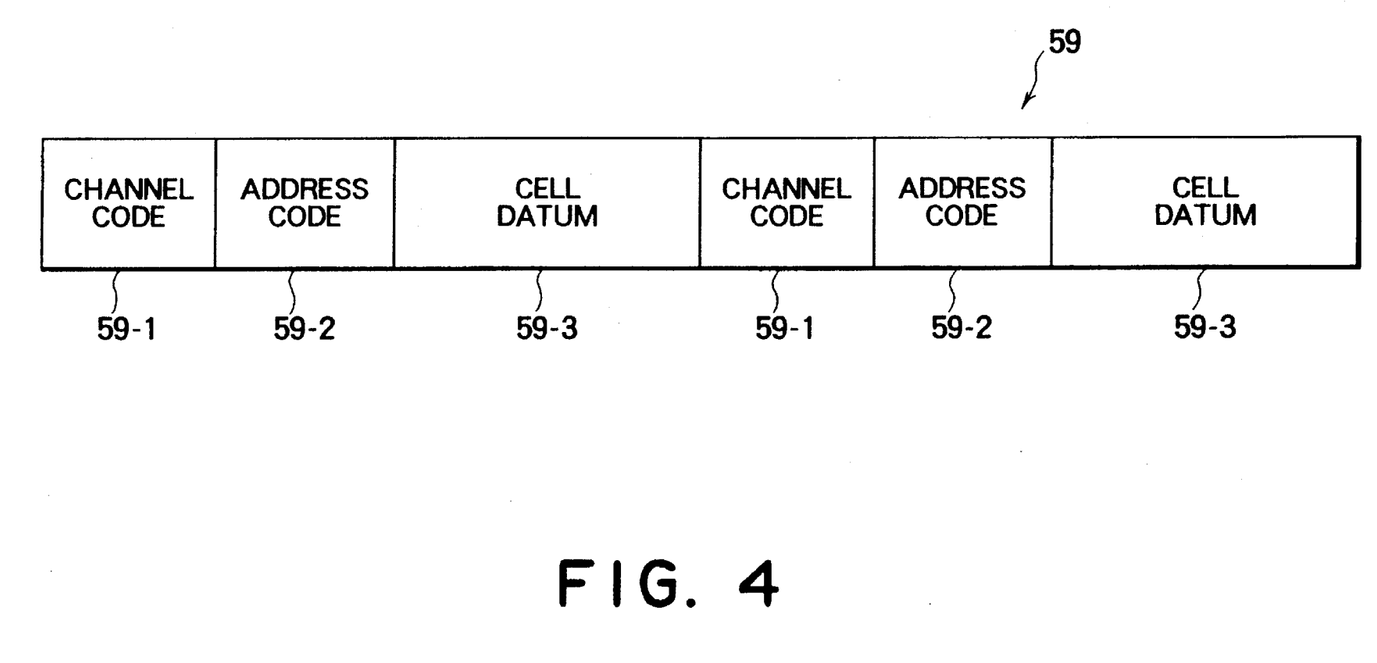
FIG. 4 is a diagram for use in describing a multiplex signal used in the transmitting system illustrated in FIG. 3.

In FIG. 4, the primary multiplex signal comprises a plurality of cells 59. Each of cells 59 has a channel code 59-1, an address code 59-2, and a cell datum 59-3. In other words, the cells have channel codes 59-1, address codes 59-2, and cell data, respectively. The cell datum 59-3 represents a part of one of the first through the M-th encoded digital video signals. The channel code 59-1 indicates one of channels of the first through the M-th encoded digital video signals. The address code 59-2 indicates a position of the cell datum 59-3 in each of the first through the M-th encoded digital video signals.

Figure 5:
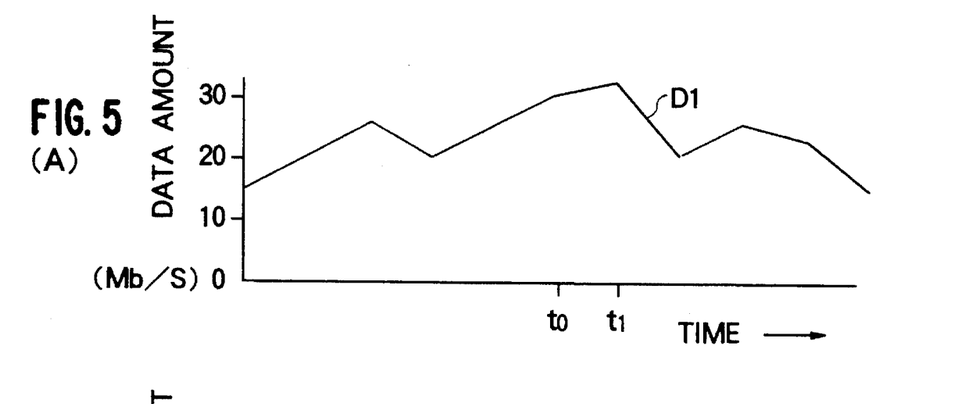
FIG. 5 is a diagram for use in describing operation of a first multiplexer of the transmitting system illustrated in FIG. 3.

Referring to FIG. 5, it is assumed that the first through the third encoders 21-1 to 21-3 are connected to the first multiplexer 55- A first curved line D1 shown in FIG. 5(A) exemplifies the first detect signal from the first data amount detector 37-1 (FIG. 2). A second curved line D2 shown in FIG. 5(B) exemplifies the second detect signal from the second data amount detector 37-2 (FIG. 2). A third curved line D3 shown in FIG. 5(C) exemplifies the third detect signal from the third data amount detector (not shown).

It is noted that a transmitting rate of the first multiplexer 55 is 60 mega bits per second. For example, a first data amount of the first input channel 31-1 is 30 mega bits per second at a time instant $t_0$. A second data amount of the second input channel 31-2 is 10 mega bits per second at the time instant $t_0$. A third data amount of the third input channel is 20 mega bits per second at the time instant $t_0$. The first multiplexer 55 prorates 30 mega bits per second to the first input channel 31-1 at the time instant $t_0$. The first multiplexer 55 prorates 10 mega bits per second to the second input channel 31-2 at the time instant $t_0$. The first multiplexer 55 prorates 20 mega bits per second to the third input channel at the time instant $t_0$.

A first data amount of the first input channel 31-1 is 32 mega bits per second at a time instant $t_1$. A second data amount of the second input channel 31-2 is 12 mega bits per second at the time instant $t_1$. A third data amount of the third input channel is 16 mega bits per second. The first multiplexer 55 prorates 32 mega bits per second to the first input channel 31-1 at the time instant $t_1$. The first multiplexer 55 prorates 12 mega bits per second to the second input channel 31-2 at the time instant $t_1$. The first multiplexer 55 prorates 16 mega bits per second to the third input channel at the time instant $t_1$.

Turning to FIG. 3, a first demultiplexer 61 is connected to the first multiplexer 55 through a data line 63, a multiplex clock line 65, and a cell clock line 67.

Figure 6:
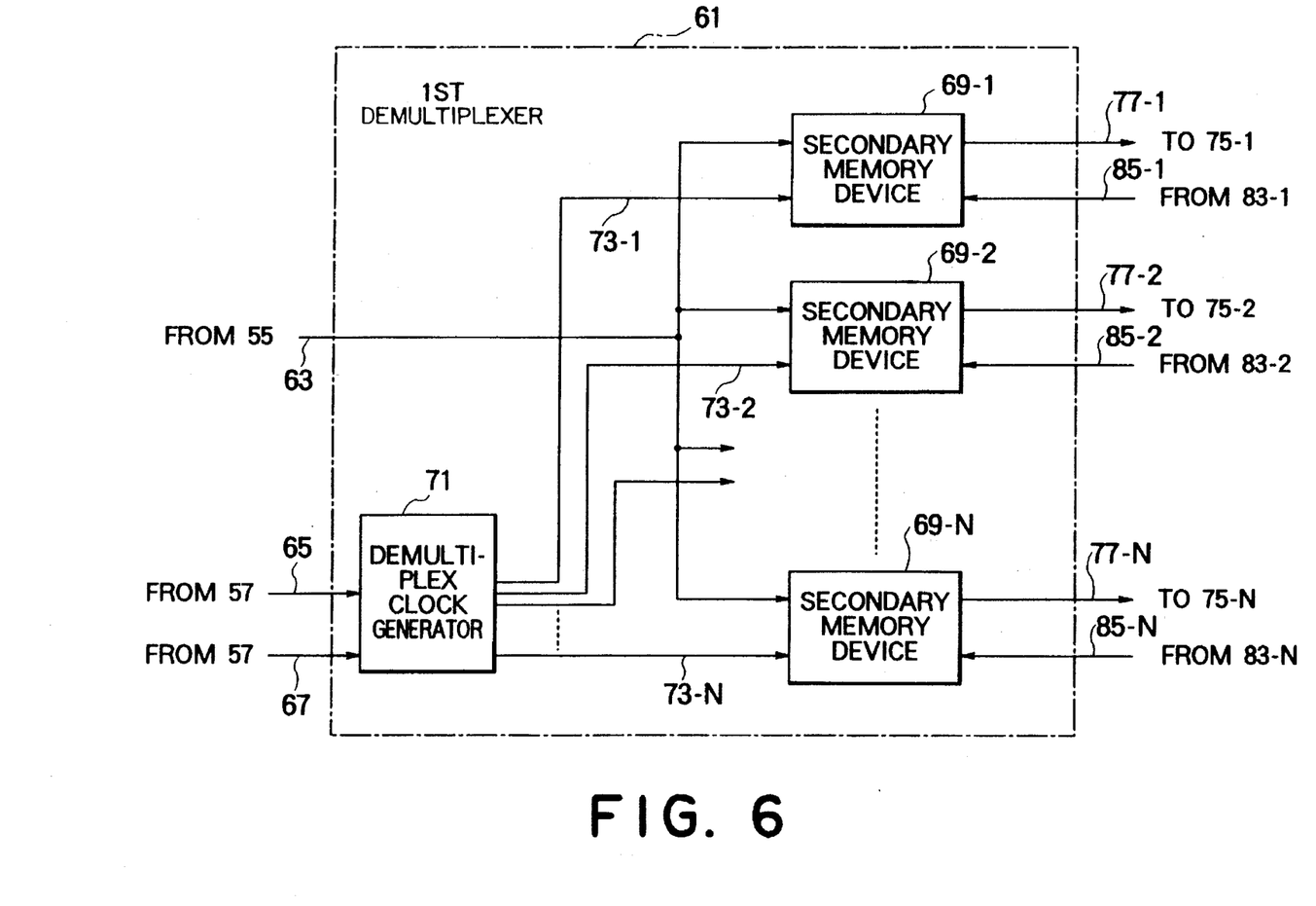
FIG. 6 is a block diagram of a first demultiplexer of the transmitting system illustrated in FIG. 3.

Referring to FIG. 6, the first demultiplexer 61 comprises first through N-th secondary memory devices 69-1 to 69-N and a demultiplex clock generator 71, where N is an integer greater than M. The first through the N-th secondary memory devices 69-1 to 69-N are connected to the first multiplexer 55 through the data line 63. The first through the N-th secondary memory devices 69-1 to 69-N are connected to the demultiplex clock generator 71 through first through N-th write lines 73-1 to 73-N, respectively.

The demultiplex clock generator 71 is connected to the multiplex clock generator 57 through the multiplex clock line 65 and the cell line 67. The demultiplex clock generator 71 is supplied with the multiplex clock signal from one multiplex clock generator 57 through the multiplex clock line 65. The demultiplex clock generator 71 is supplied with the cell clock signal from the multiplex clock generator 57 through the cell line 67.

Figure 7:
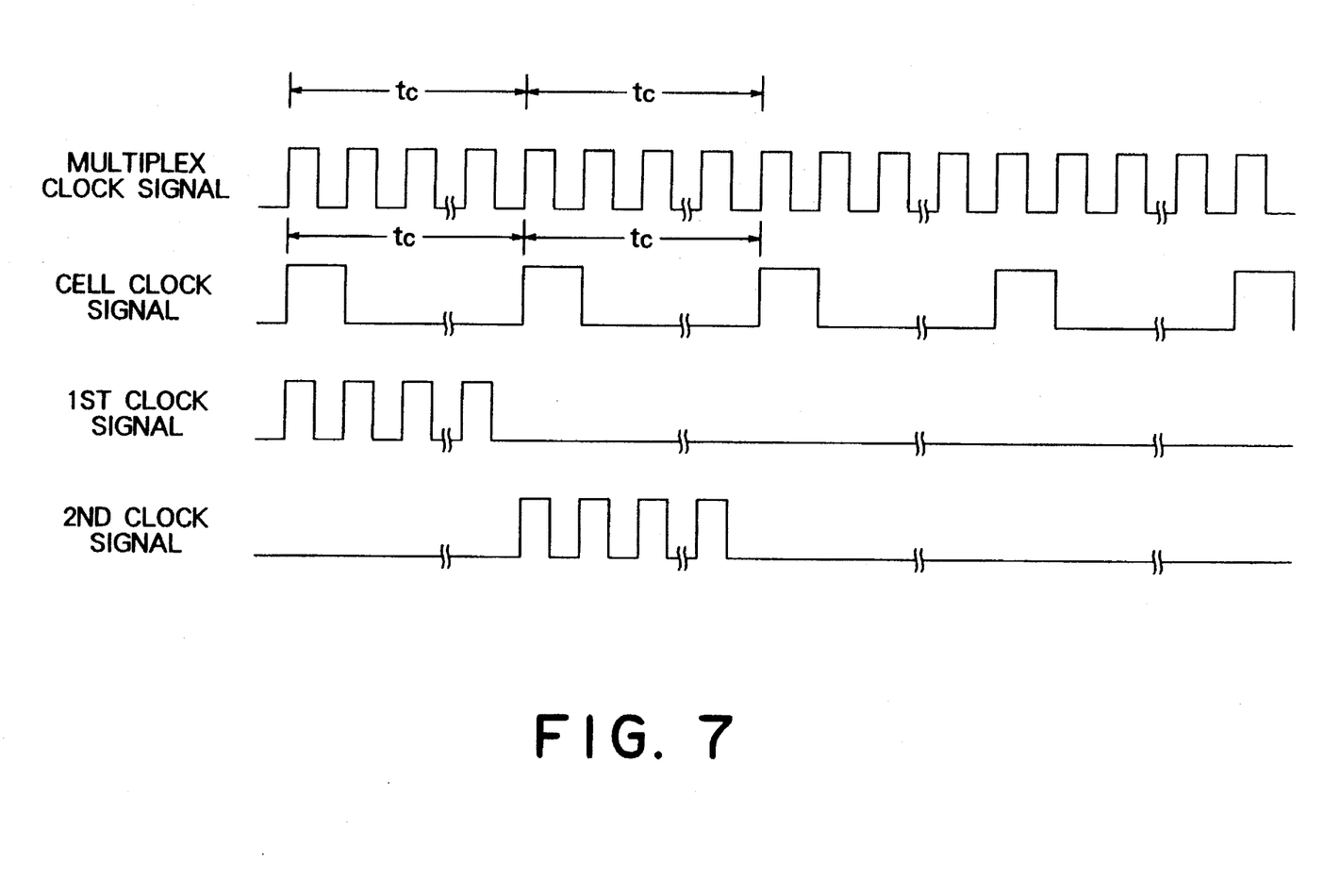
FIG. 7 is a diagram for use in describing operation of the first demultiplexer illustrated in FIG. 6.

Referring to FIG. 7, the demultiplex clock generator 71 generates at every one cell cycle time to first through N-th clock signals to supply the first through the N-th clock signals to the first through secondary memory devices 69-1 to 69-N, respectively (FIG. 6).

Turning to FIG. 6, the first through the N-th secondary memory devices 69-1 to 69-N are supplied with the primary multiplex signal from the first multiplexer 55 through the data line 63. The first through the N-th secondary memory devices 69-1 to 69-N memorize parts of the primary multiplex signal as first through N-th primary demultiplex signals when the first through the N-th secondary memory devices 69-1 to 69-N are supplied with the first through the N-th clock signals, respectively.

Namely, the first demultiplexer 61 demultiplexes the primary multiplex signal to produce the first through the N-th primary demultiplex signals.

Turning to FIG. 3, first through N-th transmitting paths 75-1 to 75-N are connected to the first through the N-th secondary memory devices 69-1 to 69-N through first through N-th data input lines 77-1 to 77-N, respectively. The first through the N-th transmitting paths 75-1 to 75-N are connected to a second multiplexer 79 through first through N-th data output lines 81-1 to 81-N, respectively.

The first through the N-th transmitting paths 75-1 to 75-N have first through N-th transmit clock generators 83-1 to 83-N, respectively. The first through the N-th transmit clock generators 83-1 to 83-N generate transmit clock signals, respectively. The first through the N-th transmit clock generators 83-1 to 83-N are connected to the first through the N-th secondary memory devices 69-1 to 69-N through first through N-th transmit read lines 85-1 to 85-N, respectively. The first through the N-th transmit clock generators 83-1 to 83-N supply the transmit clock signals to the first through the N-th secondary memory devices 69-1 to 69-N through the first through the N-th transmit read lines 85-1 to 85-N, respectively. The first through the N-th transmit clock generators 83-1 to 83-N are connected to the second multiplexer 79 through first through N-th transmit write lines 87-1 to 87-N, respectively. The first through the N-th transmit clock generators 83-1 to 83-N supply the transmit clock signals to the second multiplexer 79 through the first through the N-th transmit write lines 87-1 to 87-N, respectively.

The first through the N-th secondary memory devices 69-1 to 69-N supply the first through the N-th primary demultiplex signals to the first through the N-th transmitting paths 75-1 to 75-N through the first through the N-th data input lines 77-1 to 77-N when the first through the secondary memory devices 69-1 to 69-N are supplied with the transmit clock signals, respectively.

Figure 8:
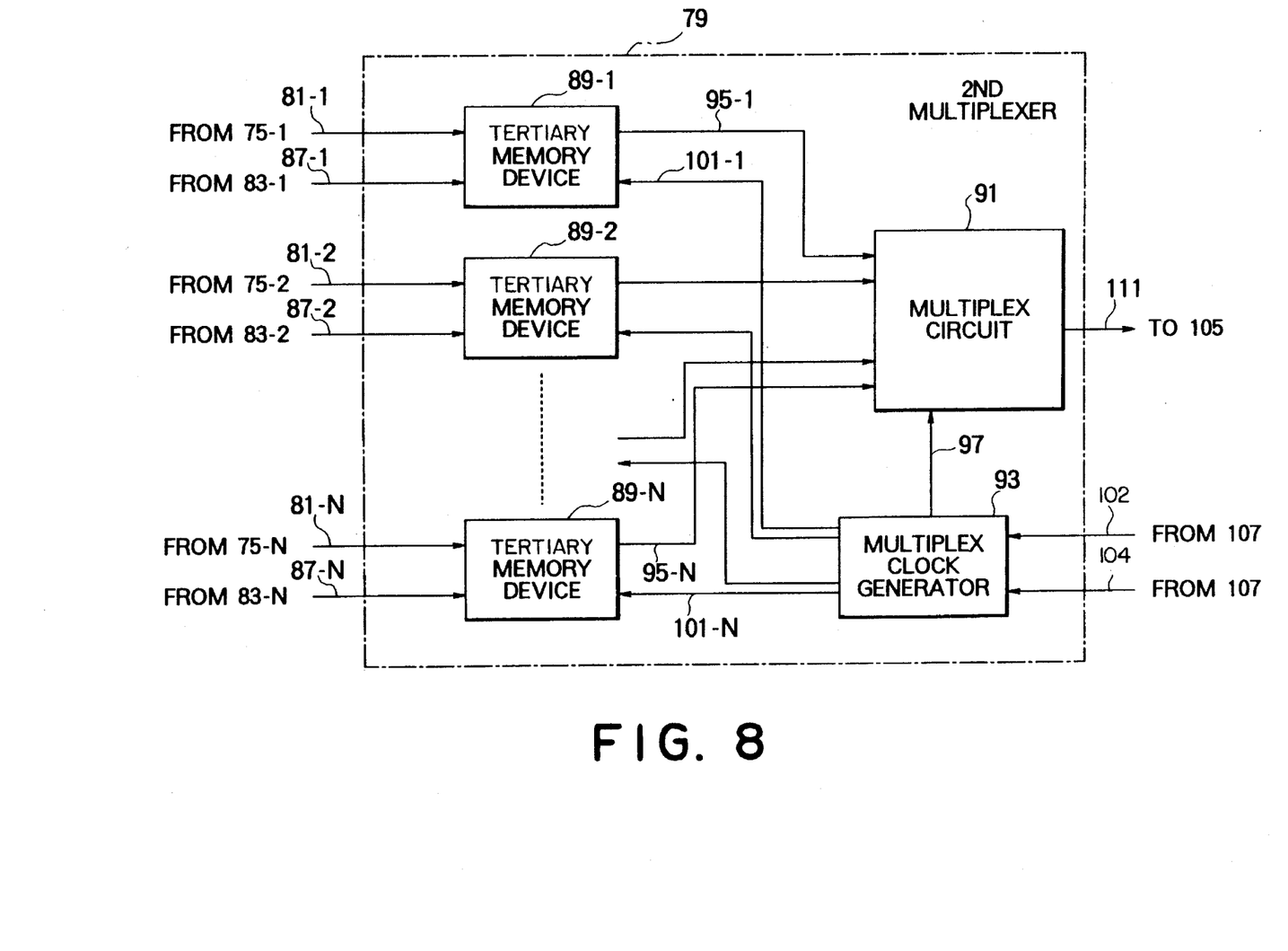
FIG. 8 is a block diagram of a second multiplexer of the transmitting system illustrated in FIG. 3.

Referring to FIG. 8, the second multiplexer 79 comprises first through N-th tertiary memory devices 89-1 to 89-N, a multiplex circuit 91, and a multiplex clock generator 93. The first through the N-th tertiary memory devices 89-1 to 89-N are connected to the first through the N-th transmitting paths 75-1 to 75-N through the first through the N-th transmit output lines 81-1 to 81-N, respectively. The first through the N-th tertiary memory devices 89-1 to 89-N are connected to the first through the N-th transmit clock generators 83-1 to 83-N through the first through the N-th transmit write lines 87-1 to 87-N, respectively. The first through the N-th tertiary memory devices 89-1 to 89-N are supplied with the first through the N-th primary demultiplex signals from the first through the N-th transmitting paths 75-1 to 75-N when the first through the N-th tertiary memory devices 89-1 to 89-N are supplied with the transmit clock signals from the first through the N-th transmit clock generators 83-1 to 83-N, respectively.

The multiplex circuit 91 is connected to the first through the N-th tertiary memory devices 89-1 to 89-N through first through N-th data lines 95-1 to 95-N, respectively. The multiplex circuit 91 is connected to the multiplex clock generator 93 through a select line 97. The multiplex clock generator 93 is connected to the first through the N-th tertiary memory devices 89-1 to 89-N through first through N-th read lines 101-1 to 101-N, respectively. The multiplex clock generator 93 is supplied with the clock signal through a clock line 102. The multiplex clock generator 93 is supplied with the cell clock signal through a cell line 104.

The multiplex clock generator 93 generates first through N-th clock signals to supply the first through the N-th clock signals to the first through the N-th tertiary memory devices 101-1 to 101-N, respectively. The multiplex clock generator 93 generates a select control signal to supply the select control signal to the multiplex circuit 91.

The first through the N-th tertiary memory devices 89-1 to 89-N are supplied with the first through the N-th primary demultiplex signals from the first through the N-th transmitting paths 75-1 to 75-N when the first through the N-th tertiary memory devices 89-1 to 89-N are supplied with the transmit clock signals from the first through the N-th transmit clock generators 83-1 to 83-N, respectively. The multiplex circuit 91 multiplexes the first through the N-th primary demultiplex signals from the first through the N-th tertiary memory devices 89-1 to 89-N in response to the select control signal from the multiplex clock generator 93 to produce a secondary multiplex signal and supply the secondary multiplex signal to a second demultiplexer 103.

Figure 9:
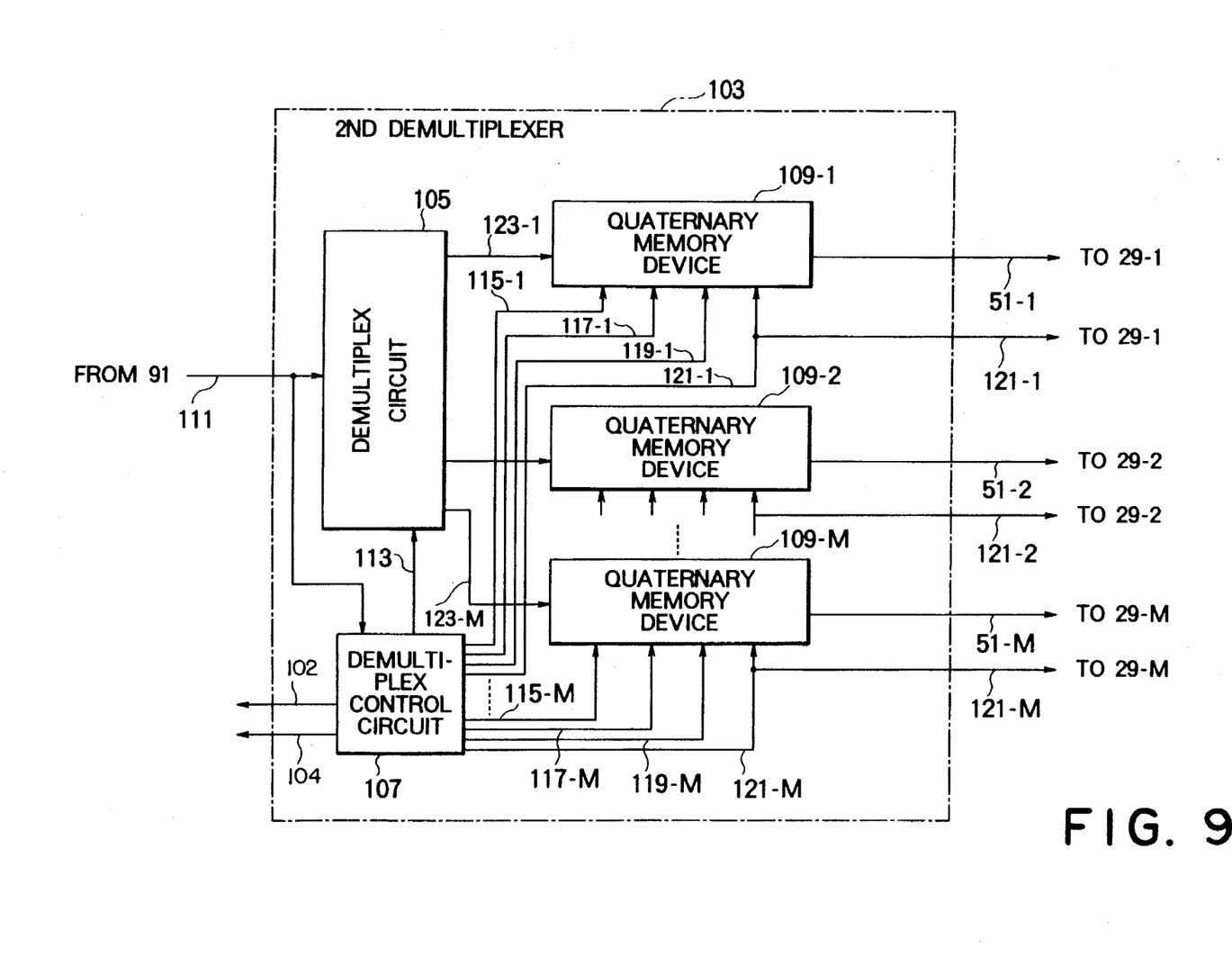
FIG. 9 is a block diagram of a second demultiplexer of the transmitting system illustrated in FIG. 3.

Referring to FIG. 9, the second demultiplexer 103 comprises a demultiplex circuit 105, a demultiplex control circuit 107, and first through M-th quaternary memory devices 109-1 to 109-N. The demultiplex control circuit 107 is connected to the multiplex clock generator 93 through the clock line 102 and the cell clock line 104. The demultiplex control circuit 107 generates the clock signal and the cell clock signal to supply the clock signal and the cell clock signal to the multiplex clock generator 93 through the clock line 102 and the cell clock line 104, respectively.

The demultiplex circuit 105 is connected to the multiplex circuit 91 through a data line 111. The demultiplex control circuit 107 is connected to the multiplex circuit 91 through the data line 111. The demultiplex circuit 105 is supplied with the secondary multiplex signal from the multiplex circuit 91. The demultiplex control circuit 107 produces a channel select signal in response to the channel codes of the secondary multiplex signal. The demultiplex control circuit 107 produces first through N-th write signals and write address signals in response to the address codes of the secondary multiplex signal. The demultiplex control circuit 107 produces first through N-th read address signals and read clock signals.

The demultiplex control circuit 107 is connected to the demultiplex circuit 105 through a control line 113 to supply the channel select signal to the demultiplex circuit 105 through the control line 113. The demultiplex control circuit 107 is connected to the first through the M-th quaternary memory devices 109-1 to 109-M through first through N-th write lines 115-1 to 115-M respectively. The demultiplex control circuit supplies the first through the M-th write signals to the first through the M-th quaternary memory devices 109-1 to 109-M through the first through the N-th write lines 115-1 to 115-M, respectively.

The demultiplex control circuit 107 is connected to the first through the M-th quaternary memory devices 109-1 to 109-M through first through M-th write address lines 117-1 to 117-M, respectively. The demultiplex control circuit 107 supplies the first through the M-th write address signals to the first through the M-th quaternary memory devices 109-1 to 109-M through the first through the M-th write address lines 117-1 to 117-M, respectively.

The demultiplex control circuit 107 is connected to the first through the N-th quaternary memory devices 109-1 to 109-M through first through N-th read address lines 119-1 to 119-M, respectively. The demultiplex control circuit 107 supplies the first through the M-th read address signals to the first through the M-th quaternary memory devices 109-1 to 109-N through the first through the M-th read address lines 119-1 to 119-M, respectively.

The demultiplex control circuit 107 is connected to the first through the M-th quaternary memory devices 109-1 to 109-M through first through M-th read clock lines 121-1 to 121-M, respectively. The demultiplex control circuit 107 supplies the first through the M-th read clock signals to the first through the M-th quaternary memory devices 109-1 to 109-M through the first through the M-th read clock lines 121-1 to 121-M, respectively.

The demultiplex circuit 105 is supplied with the secondary multiplex signal from the multiplex circuit 91 through the data line 111. The demultiplex circuit 105 demultiplexes the secondary multiplex signal in response to the channel select signal to produce first through M-th demultiplexed signals which do not include the channel codes and address codes.

The first through the M-th quaternary memory devices 109-1 to 109-N are connected to the demultiplex circuit 105 through first through M-th data lines 123-1 to 123-M, respectively. The first through the M-th quaternary memory devices 109-1 to 109-M are supplied with the first through the M-th demultiplexed signals from the demultiplex circuit 105, respectively. The one cell datum of the first through the M-th demultiplexed signals is written in a memory element of one of the first through the N-th quaternary memory devices 109-1 to 109-M that is indicated by one of the first through the M-th write address signals when one of the first through the N-th quaternary memory devices 109-1 to 109-M is supplied with the one cell datum, one of the first through the N-th write signals, and one of the first through the M-th write address signals.

The first through the N-th quaternary memory devices 109-1 to 109-M memorizes the first through the M-th demultiplexed signals as the first through the M-th encoded digital video signals, respectively. The first through the M-th quaternary memory devices 109-1 to 109-M are connected to the first through the M-th decoders 29-1 to 29-N through the first through the N-th signal lines 51-1 to 51-M, respectively (FIG. 3). The first through the M-th decoders 29-1 to 29-M are connected to the demultiplex control circuit 107 through the first through the M-th read clock lines 121-1 to 121-M, respectively. The first through the M-th decoders 29-1 to 29-M are supplied with the first through the M-th read clock signals through the first through the M-th read clock lines 121-1 to 121-M, respectively. The first through the M-th decoders 29-1 to 29-M are supplied with the cell datum of the first through the M-th encoded digital video signals from the first through the M-th quaternary memory devices 109-1 to 109-M that is indicated by one of the first through the M-th read address signals when the first through the M-th decoders 29-1 to 29-M are supplied with the first through the M-th read signals, respectively.

Turning to FIG. 3, the first through the N-th transmitting paths 75-1 to 75-N have first through N-th transmitting rates, respectively. The first through the N-th rates are different from each other. As a result, the first through the N-th primary demultiplex signals reach at different time instants to the second multiplexer 79 and the second demultiplexer 103.

Referring to FIG. 9, the first through the M-th quaternary memory devices 109-1 to 109-M supply the first through the M-th encoded digital video signals to the first through the M-th encoders 29-1 to 29-M after the first through the M-th quaternary memory devices 109-1 to 109-M memorize in a particular time period of the first through the M-th encoded digital video signals. Consequently, the first through the M-th quaternary memory devices 109-1 to 109-M can supply at the same time instant the first through the M-th encoded digital video signals to the first through the M-th decoders 29-1 to 29-M even when the first through the N-th primary demultiplex signals reach at different time instants to the second demultiplexer 103.

What is claimed is:

1. A transmitting system for use in combination with first through M-th encoders and decoders, where M represents an integer greater than two, said transmitting system comprising:

a first multiplexer for receiving first through M-th encoded digital video signals from said first through said M-th encoders, respectively, to produce a primary multiplex signal comprising a plurality of cells which have channel codes, address codes, and cell data, respectively, each of said cell data representing a part of one of said first through said M-th encoded digital video signals, each of said channel codes indicating one of said first through said M-th encoded digital video signals, each of said address codes indicating a position of one of said cell data in each of said first through said M-th encoded digital video signals;

a first demultiplexer connected to said first multiplexer for demultiplexing said primary multiplex signal to produce first through N-th primary demultiplex signals each of which represents one of said cells, where N represents an integer greater than M;

first through N-th transmitting paths connected to said first demultiplexer for transmitting said first through said N-th primary demultiplex signals, respectively;

a second multiplexer connected to said first through said N-th transmitting paths for multiplexing said first through N-th primary demultiplex signals to produce a secondary multiplex signal; and a second demultiplexer connected to said second multiplexer for demultiplexing said secondary multiplex signal in response to said channel codes and said address codes to produce said first through said M-th encoded digital video signals and supply all of said first through said M-th encoded digital video signals at the same time instant to said first through said M-th decoders, respectively.

2. A transmitting system as claimed in claim 1, said first through said M-th encoders comprising first through M-th primary memory devices for memorizing said first through said M-th encoded digital video signals, respectively, said transmitting system further comprising first through M-th data amount detectors which detect first through M-th amount of said first through said M-th encoded digital video signals in said first through said M-th primary memory devices to produce first through M-th amount detect signals, respectively, said first multiplexer connected to said first through said M-th data amount detectors for producing said primary multiplex signal in response to said first through said M-th amount detect signals.

3. A transmitting system as claimed in claim 2, said first demultiplexer comprising first through N-th secondary memory devices connected to said first multiplexer and said first through said N-th transmitting paths, respectively, for memorizing said first through said N-th primary demultiplex signals to supply said first through said N-th primary demultiplex signals to said first through said N-th transmitting paths, respectively.

4. A transmitting system as claimed in claim 3, said second multiplexer comprising first through N-th tertiary memory devices and a multiplex circuit, said first through N-th tertiary memory devices connected to said first through said N-th transmitting paths for memorizing said first through said N-th primary demultiplex signals, respectively, said multiplex circuit connected to said first through said N-th tertiary memory devices for multiplexing said first through said N-th primary demultiplex signals to produce said secondary multiplex signal.

5. A transmitting system as claimed in claim 4, said second demultiplexer comprising a demultiplex circuit and first through M-th quaternary memory devices, said demultiplex circuit connected to said multiplex circuit for demultiplexing said secondary multiplex signal in response to said channel codes and said address codes to produce said first through said M-th encoded digital video signals, said first through said M-th quaternary memory devices connected to said demultiplex circuit for memorizing said first through said M-th encoded digital video signal to supply said first through said M-th encoded digital video signals to said first through said M-th decoders, respectively.

6. A transmitting system for use in combination with first through M-th encoders and decoders, where M represents an integer greater than two, said transmitting system comprising:

a first multiplexer for receiving first through M-th encoded digital video signals from said first through said M-th encoders, respectively, to produce a primary multiplex signal comprising a plurality of cells which have channel codes, address codes, and cell data, respectively, each of said cell data representing a part of one of said first through said M-th encoded digital video signals, each of said channel codes indicating one of said first through said M-th encoded digital video signals, each of said address codes indicating a position of one of said cell data in each of said first through said M-th encoded digital video signals;

a first demultiplexer connected to said first multiplexer for demultiplexing said primary multiplex signal to produce first through N-th primary demultiplex signals each of which represents one of said cells, where N represents an integer greater than M;

first through N-th transmitting paths connected to said first demultiplexer for transmitting said first through said N-th primary demultiplex signals, respectively;

a second multiplexer connected to said first through said N-th transmitting paths for multiplexing said first through said N-th primary demultiplex signals to produce a secondary multiplex signal; and a second demultiplexer connected to said second multiplexer for demultiplexing said secondary multiplex signal in response to said channel codes and said address codes to produce said first through said M-th encoded digital video signals and supply said first through said M-th encoded digital video signals to said first through said M-th decoders, respectively;

said first through said M-th encoders comprising first through said M-th primary memory devices for memorizing said first through said M-th encoded digital video signals, respectively, said transmitting system further comprising first through M-th data amount detectors which detect first through M-th amount of said first through said M-th encoded digital video signals in said first through said M-th primary memory devices to produce first through M-th amount detect signals, respectively, said first multiplexer connected to said first through said M-th data amount detectors for producing said primary multiplex signal in response to said first through said M-th amount detect signals;

said first demultiplexer comprising first through N-th secondary memory devices connected to said first multiplexer and said first through said N-th transmitting paths, respectively, for memorizing said first through said N-th primary demultiplexer signals to supply said first through said N-th primary demultiplex signals to said first through said N-th transmitting paths, respectively;

said second multiplexer comprising first through N-th tertiary memory devices and a multiplex circuit, said first through N-th tertiary memory devices connected to said first through said N-th transmitting paths for memorizing said first through said N-th primary demultiplex signals, respectively, said multiplex circuit connected to said first through said N-th tertiary memory devices for multiplexing said first through N-th primary demultiplex signals to produce said secondary multiplex signal.

7. A transmitting system as claimed in claim 6, said second demultiplexer comprising a demultiplex circuit and first through M-th quaternary memory devices, said demultiplex circuit connected to said multiplex circuit for demultiplexing said secondary multiplex signal in response to said channel codes and said address codes to produce said first through said M-th encoded digital video signals, said first through said M-th quaternary memory devices connected to said demultiplex circuit for memorizing said first through said M-th encoded digital video signal to supply said first through said M-th encoded digital video signals to said first through said M-th decoders, respectively.

* * * * *